United States Patent [19]
Blaum et al.

[11] Patent Number: 5,999,110
[45] Date of Patent: Dec. 7, 1999

[54] DEFECT TOLERANT BINARY SYNCHRONIZATION MARK

[75] Inventors: Mario Blaum, San Jose; Steven Robert Hetzler, Los Altos, both of Calif.; Glen Alan Jaquette, Tucson, Ariz.; William John Kabelac, Morgan Hill, Calif.

[73] Assignee: International Business Machines Corporation, Armonk, N.Y.

[21] Appl. No.: 09/024,422

[22] Filed: Feb. 17, 1998

[51] Int. Cl.⁶ .......................... H03M 7/00; H03M 13/00
[52] U.S. Cl. ................................................ 341/59
[58] Field of Search .................... 341/50, 51, 58, 341/59, 60, 68, 94; 371/37.4, 48, 47.1, 2.1

[56] References Cited

U.S. PATENT DOCUMENTS

| | | | |
|---|---|---|---|
| 3,740,125 | 6/1973 | Harris | 352/17 |
| 4,933,786 | 6/1990 | Wilson | 360/78.14 |
| 5,481,413 | 1/1996 | Kawada et al. | 360/53 |
| 5,485,461 | 1/1996 | Asgari | 370/94.2 |
| 5,491,479 | 2/1996 | Wilkinson | 341/158 |
| 5,856,986 | 1/1999 | Sobey | 371/27.7 |

*Primary Examiner*—Howard L. Williams
*Assistant Examiner*—Peguy JeanPierre
*Attorney, Agent, or Firm*—John H. Holcombe; Robert M. Sullivan

[57] ABSTRACT

Disclosed is an error tolerant binary encoded synchronization mark concatenated with a known pattern, such as a VFO pattern, comprising an encoded pattern of a fixed plurality of bits, the encoded synchronization pattern being at maximum Hamming distance from the concatenated known pattern for the number of bits in the fixed plurality of bits. The error tolerant synchronization mark may also be concatenated with the VFO pattern seen in reverse, and the synchronization pattern additionally is at maximum Hamming distance from the concatenated known VFO pattern seen in reverse.

44 Claims, 3 Drawing Sheets

```
d  1010101010101010101010101010000010010001001010001010
9  0000100100010010100 01010
12  000010010001001010001010
9   000010010001001010001010
14   000010010001001010001010
10    000010010001001010001010
13     000010010001001010001010
11      000010010001001010001010
12       000010010001001010001010
9        000010010001001010001010
11        000010010001001010001010
10         000010010001001010001010
10          000010010001001010001010
14           000010010001001010001010
9            000010010001001010001010
12            000010010001001010001010
11             000010010001001010001010
11              000010010001001010001010
9               000010010001001010001010
11                000010010001001010001010
11                 000010010001001010001010
9                  000010010001001010001010
12                  000010010001001010001010
10                   000010010001001010001010
10                    000010010001001010001010
10                     000010010001001010001010
14                      000010010001001010001010
0                       000010010001001010001010
```

| d  | 1 0 1 0 1 0 1 0 1 0 1 0 1 0 1 0 1 0 1 0 1 0 1 0 1 0 0 0 0 1 0 0 0 1 0 0 0 1 0 0 1 0 1 0 0 1 0 0 1 0 |
|----|---|
| 14 | 0 0 0 0 1 0 0 1 0 0 0 1 0 0 1 0 1 0 0 0 1 0 1 0 |
| 11 |   0 0 0 0 1 0 0 1 0 0 0 1 0 0 1 0 1 0 0 0 1 0 1 0 |
| 13 |     0 0 0 0 1 0 0 1 0 0 0 1 0 0 1 0 1 0 0 0 1 0 1 0 |
| 10 |       0 0 0 0 1 0 0 1 0 0 0 1 0 0 1 0 1 0 0 0 1 0 1 0 |
| 14 |         0 0 0 0 1 0 0 1 0 0 0 1 0 0 1 0 1 0 0 0 1 0 1 0 |
| 9  |           0 0 0 0 1 0 0 1 0 0 0 1 0 0 1 0 1 0 0 0 1 0 1 0 |
| 13 |             0 0 0 0 1 0 0 1 0 0 0 1 0 0 1 0 1 0 0 0 1 0 1 0 |
| 11 |               0 0 0 0 1 0 0 1 0 0 0 1 0 0 1 0 1 0 0 0 1 0 1 0 |
| 11 |                 0 0 0 0 1 0 0 1 0 0 0 1 0 0 1 0 1 0 0 0 1 0 1 0 |
| 10 |                   0 0 0 0 1 0 0 1 0 0 0 1 0 0 1 0 1 0 0 0 1 0 1 0 |
| 15 |                     0 0 0 0 1 0 0 1 0 0 0 1 0 0 1 0 1 0 0 0 1 0 1 0 |
| 6  |                       0 0 0 0 1 0 0 1 0 0 0 1 0 0 1 0 1 0 0 0 1 0 1 0 |
| 16 |                         0 0 0 0 1 0 0 1 0 0 0 1 0 0 1 0 1 0 0 0 1 0 1 0 |
| 9  |                           0 0 0 0 1 0 0 1 0 0 0 1 0 0 1 0 1 0 0 0 1 0 1 0 |
| 12 |                             0 0 0 0 1 0 0 1 0 0 0 1 0 0 1 0 1 0 0 0 1 0 1 0 |
| 9  |                               0 0 0 0 1 0 0 1 0 0 0 1 0 0 1 0 1 0 0 0 1 0 1 0 |
| 13 |                                 0 0 0 0 1 0 0 1 0 0 0 1 0 0 1 0 1 0 0 0 1 0 1 0 |
| 9  |                                   0 0 0 0 1 0 0 1 0 0 0 1 0 0 1 0 1 0 0 0 1 0 1 0 |
| 11 |                                     0 0 0 0 1 0 0 1 0 0 0 1 0 0 1 0 1 0 0 0 1 0 1 0 |
| 9  |                                       0 0 0 0 1 0 0 1 0 0 0 1 0 0 1 0 1 0 0 0 1 0 1 0 |
| 13 |                                         0 0 0 0 1 0 0 1 0 0 0 1 0 0 1 0 1 0 0 0 1 0 1 0 |
| 8  |                                           0 0 0 0 1 0 0 1 0 0 0 1 0 0 1 0 1 0 0 0 1 0 1 0 |
| 12 |                                             0 0 0 0 1 0 0 1 0 0 0 1 0 0 1 0 1 0 0 0 1 0 1 0 |
| 8  |                                               0 0 0 0 1 0 0 1 0 0 0 1 0 0 1 0 1 0 0 0 1 0 1 0 |
| 10 |                                                 0 0 0 0 1 0 0 1 0 0 0 1 0 0 1 0 1 0 0 0 1 0 1 0 |
| 14 |                                                     0 0 0 0 1 0 0 1 0 0 0 1 0 0 1 0 1 0 0 0 1 0 1 0 |
| 4  |                                                         0 0 0 0 1 0 0 1 0 0 0 1 0 0 1 0 1 0 0 0 1 0 1 0 |

*FIG. 5*

DEFECT TOLERANT BINARY SYNCHRONIZATION MARK

TECHNICAL FIELD

This invention relates to the recording or transmission of encoded binary data and, more particularly, to the use of synchronization marks interspersed with the encoded binary data to align a decoder to the start of the encoded data and its codeword boundaries.

BACKGROUND OF THE INVENTION

A typical recording media records data in the form of transitions between two opposite states. In magnetic recording media, such as magnetic tape, the transitions are between opposite magnetic polarities. Data to be provided to a recording channel is typically a sequential string of bits, to be recorded on the recording media as transitions. A typical example of encoded data is run length limited (RLL) encoded data. In RLL encoding, transitions typically represent "1" bits and are separated by spaces which represent "0" bits. The distance between transitions therefore represents the number of "0" bits, and are detected by counting the number of clocks between the transitions. The clocks are not recorded with the data and must be determined from the data itself.

Thus, a data set will include a VFO ("VFO" stands for variable frequency oscillator) pattern at a specific location (typically a header) and of a particular known transition frequency to synchronize the read clock (typically a phase locked loop or PLL) to the codeword bit frequency. The VFO pattern is typically a repetitive codeword pattern, such as a sequence of "10" or 2T bits, but which is identifiable because of its location in a header. A known sync pattern is typically also provided between the VFO pattern and any encoded data to allow the decoder to align to the codeword boundaries and to the start location of the incoming data.

If the PLL does not achieve complete phase lock, or if the decoder does not align to the codeword boundaries on the incoming data (either of which may happen if a media defect is present), the decoder will not be able to successfully decode incoming encoded data, until the next Sync or Resync pattern is encountered, usually in the header of the next data set or in a header for a grouping of codeword groups. When a Sync pattern is not detected (missed) or detected erroneously in the wrong position (e.g., due to a defect), the exact bit position and alignment to codeword boundaries is not known. Accordingly, the decoder will not be able to successfully decode the encoded data unless or until some further synchronization field is encountered, such as the next Sync or Resync. This is known as infinite error propagation, and this type of failure can be catastrophic.

Even though the location of the VFO pattern and the synchronization pattern are known, a difficulty is that misdetection of one or more bits in the synchronization pattern may prevent recognition of the synchronization pattern. Without proper recognition of the synchronization pattern, the data detector will not be in sync with the recorded data and may be unable to recognize the data.

Errors in the data are typically handled by using well-known error correcting codes. Such codes allow detection and correction of many data recording errors. However, errors in the VFO or synchronizing patterns may result in missing detection of the synchronization pattern or detecting it in the wrong place. Therefore, the data detection may begin with reading data before or after the data really starts. If the start of data is not determined via detection of the synchronization mark, all data between it and any subsequent synchronization mark which is detected successfully will be lost. This may have a catastrophic effect, rendering useless the error correcting codes protecting the data.

SUMMARY OF THE INVENTION

It is an object of the present invention to provide a synchronizing pattern that is recognizable despite the occurrence of errors in detection of the pattern.

Disclosed is an error tolerant binary encoded (recorded or transmitted) synchronization mark concatenated with a known pattern, such as a VFO pattern, comprising an encoded pattern of a fixed plurality of bits, the encoded synchronization mark being at maximum Hamming distance from the concatenated known pattern for the number of bits in the fixed plurality of bits.

The error tolerant recorded synchronization mark may also be concatenated with the reverse (phase shifted version) of the known (VFO) pattern, and synchronization pattern additionally is at maximum Hamming distance from the concatenated reverse known pattern.

If the data is encoded with an RLL (d,k) code which is a (1,7) code, and having an encoding rate (a):(b) which is a rate of 2:3, and the fixed plurality of bits is equivalent to two bytes of data before encoding so that the fixed plurality of bits is 24 bits, and the VFO field utilized is a concatenated ". . . 1010 . . ." pattern, the encoded pattern is one of the following patterns:

000010010001001010001010
000010010100100010100010
001001001000010000101010
001001001001010010101010
001001010010000010001010

A data recording medium, a data recording encoder, and a method for recording are also disclosed.

For a fuller understanding of the present invention, reference should be made to the following detailed description taken in conjunction with the accompanying drawings.

BRIEF DESCRIPTION OF THE DRAWINGS

FIG. 5 is a table representing the Hamming characteristics of the synchronization pattern of the present invention subjected to two bit shifts, with respect to a concatenated VFO pattern.

DETAILED DESCRIPTION OF THE INVENTION

Figure 1:
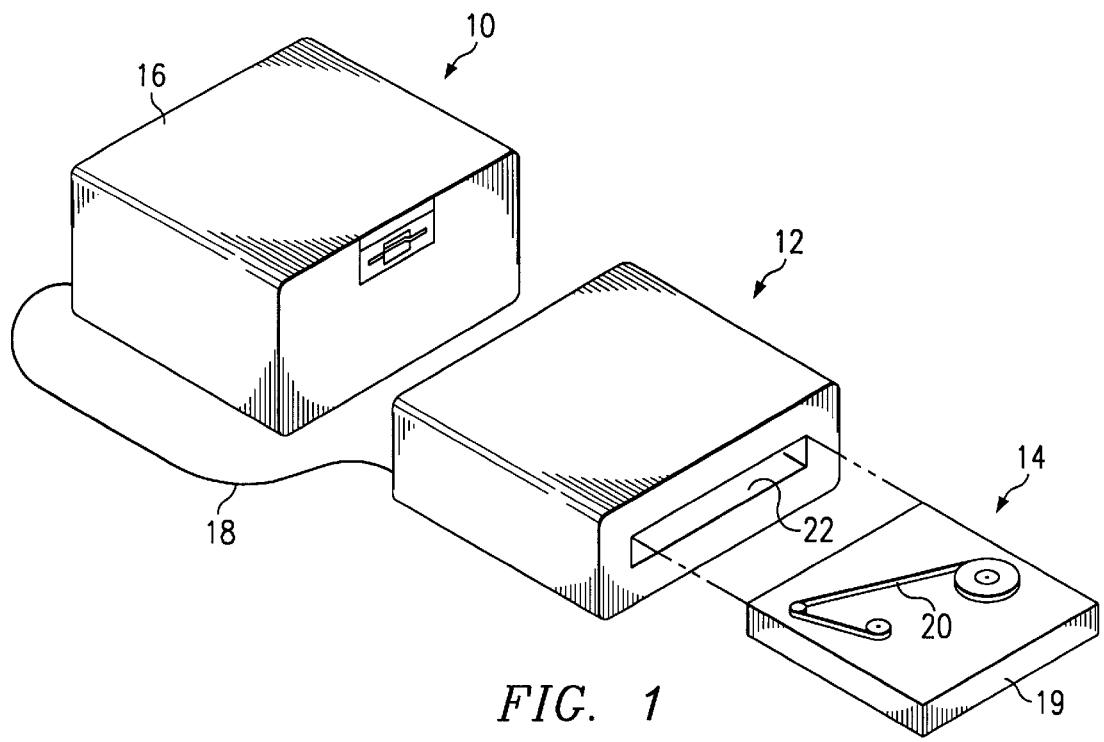
FIG. 1 is a perspective view representation of a tape drive data storage device and associated tape cartridge in accordance with an embodiment of the present invention.
Figure 2:
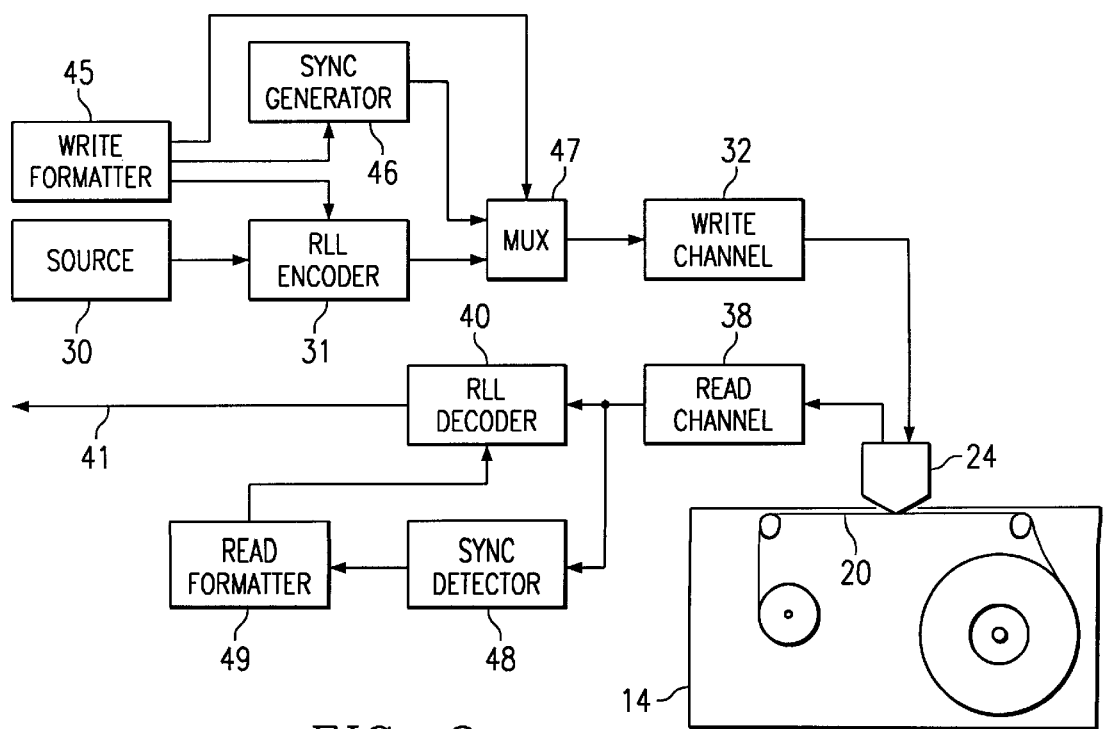
FIG. 2 is a block diagram of the tape drive of FIG. 1 and data handling circuitry in accordance with an embodiment of the present invention.

Referring to FIGS. 1 and 2, a data recording system 10 is illustrated that encodes and records data interspersed with an error tolerant binary encoded recorded synchronization mark in accordance with an embodiment of the present invention. Referring to FIG. 1, the system 10 includes a tape drive 12 that accepts a tape data cartridge 14 and is connected to a host processor 16 by a cable 18. The tape cartridge 14 comprises a housing 19 containing a length of magnetic tape 20. The tape drive 12 includes a receiving slot 22 into which the cartridge 14 is inserted. The host processor 16 can comprise any suitable processor, for example, a personal computer such as the IBM "Aptiva", or can be a workstation such as the IBM "RS6000", or can be a systems computer, such as the IBM "AS400". The tape drive 12 is preferably compatible with the associated host processors and can assume any one of a variety of cartridge or cassette linear formats. Examples of such tape drives include the IBM "3490" tape drive units, or "Digital Linear Tape" or "Travan" compatible tape drives.

Referring to FIG. 2, such tape drives typically include drive motors (not shown) for rotating the reels of the cartridge 14 to move the tape 20 across a head assembly 24. The head assembly includes a data head for writing data in a data track or in parallel data tracks and for reading data recorded in one or more data tracks.

The data to be encoded and recorded is received from a source 30, which may originate at host 16, and is encoded for transmission and recording by a data encoder 31, which may comprise a run length limited encoder, and the encoded data is input to a channel input 32. The channel may comprise a transmission medium or may comprise a data storage drive, such as magnetic tape drive 12 or other data storage device. The encoded data is received from the channel or read from the data storage device 12 and received at read channel 38 and then decoded by decoder 40 which provides the output binary data on output 41. If the encoding and decoding were done correctly and there were no errors, the binary output data 41 will be identical to the input binary data from source 30.

Encoding schemes which impose limits on the distances between transitions between two binary states, called run length limited (RLL) binary codes are prevalent in the data transmission and data recording arts for encoding an unconstrained set of binary data into a constrained set of codewords. Such codes may be described as having a minimum distance (d) of "0"s between "1"s (or recording transitions) and a maximum distance (k) of "0"s between "1"s.

Various versions of RLL (d,k) codes have been found to be particularly useful, and may comprise variable length codewords or fixed length codewords. The channel input 32 and output channel 38 are typically asynchronous, and, if a data storage drive 12 is utilized as an archive device, such as a magnetic tape drive, the output channel may not provide the data for a year or more, when needed to restore a primary storage device. Thus, the data stream into the read channel must provide the clocking necessary to allow the read channel 38 to interpret the transitions of the stored data and read the data so that decoder 40 may decode the channel output data. However, the RLL codes do not typically allow a PLL to acquire phase-lock to encoded random data. Therefore, clocking fields are typically appended to the encoded data fields to allow the PLL to achieve phase-lock before entering encoded data fields, which require the PLL's clock to be successfully read.

Typically, headers having the needed clocking information, as well as other needed information, are added to each data set, etc., by write formatter 45. For example, write formatter 45 operates RLL encoder 31, a sync generator 46 and multiplexor 47 to arrange the encoded data, Sync signals, etc., in a desired format. The clocking information may then be utilized by the output or read channel 38 to identify the position of each of the transitions in the encoded data and supply that information to the decoder 40 for decoding the encoded data. The ouput signal patterns from the read channel 38 are also supplied to a sync detector 48 which detects the sync patterns from the output signals. Read formatter 49 uses the Sync detection to decide which of the RLL decoder output is data.

Figures 3, 4:
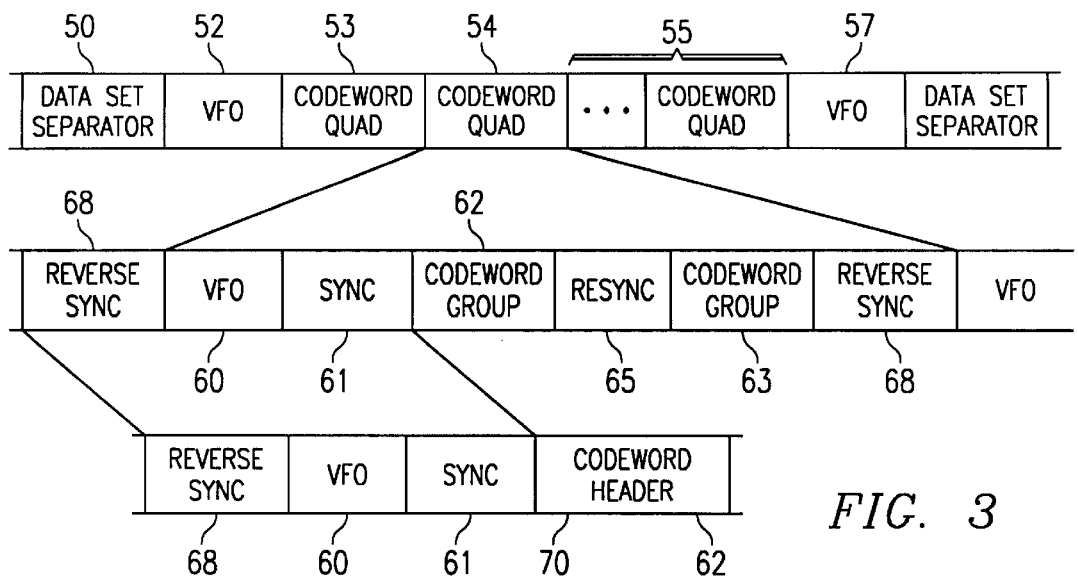
FIG. 3 is a diagrammatic illustration of the recording or channel format of encoded data sets employing the synchronization pattern of the present invention.
FIG. 4 is a table representing the Hamming characteristics of the synchronization pattern of the present invention with respect to a concatenated VFO pattern.

A typical example of a format of the encoded data, for magnetic tape, is illustrated in FIG. 3. Each data set is separated by a data set separator, or gap 50. When the data is recorded by a magnetic tape drive, the gap is typically called the "IBG" or interblock gap. The gap is sometimes followed by a "VFO" area 52, which is utilized by the output channel PLL to bring its operating frequency to that of the VFO area. ("VFO" stands for variable frequency oscillator. Some modern systems no longer use an analog variable frequency oscillator, but the terminology remains in use.) In data recording, the data storage drive may operate at various speeds, or may stop and restart or reverse direction, therefore causing changes in the data frequency, which must be determined by the PLL by detecting the VFO area frequency.

The VFO area 52 is then followed by the encoded data 53–55, and, in data storage drives that may move forward or backwards, such as magnetic tape, a backwards VFO area 57.

A typical grouping of codeword groups, or codeword quad 54, is expanded and shown in greater detail. The typical codeword quad includes a header with a leading VFO pattern 60 and a "Sync" pattern 61, a plurality of codeword groups 62–63, separated by a resync pattern 65, and having a "Reverse Sync" pattern 68 for magnetic tape, at the end of the quad, adjacent to the next VFO pattern. Each of the codeword groups 62–63 may be of any suitable length, for example, a codeword data of 480 bytes in length and a codeword header 70 of 10 bytes for a total of 490 bytes.

The VFO pattern 60 is typically a repetitive high frequency codeword pattern, but is identifiable because of its location in a header, and provides a short pattern in which the clock or PLL may adjust the operating frequency to that of the VFO area 52 (phase-lock). The VFO pattern 60 must be sufficiently long, however, that the frequency can be detected and locked, for example 14 bytes, as compared to the data set VFO which may be a total of 30 bytes, combining a 16 byte data set pattern with the first codeword quad.

The Sync pattern 61 is provided to allow the RLL decoder to determine the start of RLL encoded data, aligning it to the RLL codeword boundaries. Because the Sync pattern is always adjacent to a VFO pattern (as opposed to a resync pattern which typically is not), it should be robustly detectable coming out of a VFO pattern. This does not mean that it must be an RLL violation (as a resync pattern might be). The location of the Sync pattern largely eliminates any concern that it will be seen in encoded data.

If the PLL does not achieve phase lock, or if the decoder does not align to the codeword boundaries on the incoming data, it will result in the inability to decode any of the data codewords, as described above.

An example of data encoding employed for magnetic recording is an RLL (d,k) (1,7) code. Upon encoding, this means that every pair of consecutive transitions or "1"s must be separated by at least one "0" and by at most seven "0"s. In terms of clock period "T", the pairs of transitions are separated by at least "2T" and at most "8T" lengths between transitions. In order to read the data, it must be synchronized by the VFO and by the synchronizing pattern 61. Preferably, the synchronizing pattern should have the same constraints as the data for ease in detection by the recording read channel 38 in FIG. 2. Thus, it is preferable that the synchronizing pattern 61 also be subject to the RLL (1,7) constraints. It is also preferable that the VFO pattern 60 be encountered before the sync pattern 61 and concatenated therewith, so that the frequency may be adjusted before the RLL decoder is aligned to the Sync mark. Another characteristic of some magnetic tape recording systems is that the tape can be read in both the forward and backward directions. Thus, so that a VFO pattern may be encountered first, followed by a synchronization mark when reading backwards, the reverse synchronization pattern 68 is written on the opposite side of the VFO pattern and in reverse order, and concatenated with the trailing VFO pattern. Thus, the reverse sync 68, the VFO 60 and the next sync 61 may be concatenated in a sequential string.

The typical synchronization pattern 61 or 68 is equivalent to 2 bytes of data. Thus, if the data is encoded at a rate of 2:3, meaning two input bits are encoded into three output (or channel) bits, one byte of input data is encoded into 12 bits of output data. Therefore, a typical synchronization pattern is 24 channel bits long.

Starting from the VFO field 60 for frequency locking the PLL, the start of the data field is found by locating the synchronization pattern.

However, the system is subject to errors. As described above, errors in the data are handled by using error correcting techniques. Errors in the VFO and/or synchronizing patterns may result in finding the synchronizing pattern in the wrong place, with the consequence that the recording read channel begins supplying "data" before or after the data actually starts. The RLL decoder will then be totally out of sync, with the result that perhaps none of the supplied "data" can be decoded. A typical type of error occurring in data recording systems is one of "bit shift". A difficulty, particularly with magnetic transitions recorded on magnetic tape, is that the intersymbol interference of high frequency signals tends to shift the detection of any transition away from an adjacent transition and towards a long string of no transitions (many "0" between the transitions). Thus, the detection circuitry tends to shift the transitions of longer spans, such as patterns greater than "2T" in length, closer together, and into positions such that they may instead be erroneously detected as shorter patterns.

Another common type of error is that one transition occurs too slowly to form a strong signal when read, and therefore does not meet a minimum detection threshold of a peak detector. Thus, the transition is missed completely.

Still another common error results from defects in the media which results in a dramatic loss of signal amplitude and change of transfer function for a length of the track on which the data is recorded.

Thus, in accordance with the present invention, the error tolerant binary encoded synchronization mark is a fixed length encoded pattern being at maximum Hamming distance from the concatenated known VFO pattern for the number of bits in the fixed length of the pattern. Since the data may also be read in the reverse direction, the synchronization mark is also recorded in the reverse direction after the encoded data and must also be at maximum Hamming distance from the concatenated known VFO pattern in the reverse direction.

As a result, no portion of the synchronization pattern is likely to be confused with the VFO pattern, and the synchronization pattern is unlikely to be recognized until the full pattern is actually encountered. Thus, if a valid synchronization pattern is encountered before encoded data is, it will likely be recognized in the correct location.

In an example of an RLL (1,7) code, of rate 2:3, and a VFO pattern of a sequence of repeating "10" or "2T" terms, 5 (1,7)-constrained patterns exist at maximum Hamming distance of at least 9 between the concatenation of the VFO pattern ( . . . 1010) and the pattern and the concatenation of the reversed VFO pattern ( . . . 0101) and the pattern. The 5 (1,7)-constrained patterns are as follows:

000010010001001010001010
000010010100100010100010
001001001000010000101010
001001001001010010101010
001001010010000010001010.

Referring to FIG. 2, the VFO pattern and the selected synchronization pattern are employed by data formatter 45 and inserted into the encoded data stream to the recording write channel 32 for recording on the data storage media 20.

The table of FIG. 4 illustrates one of the synchronization patterns concatenated with the VFO pattern and showing the comparison of the synchronization pattern to the concatenated patterns at each of 24 bit positions until a match occurs. The received concatenated VFO and synchronization pattern is:

1010101010101010101010101000001001000100101000 1010.

The Hamming distance "d" is shown for each of the bit positions with a Hamming distance of "0" indicating a match. As illustrated, no Hamming distance is closer than "9" before the synchronization pattern is detected. Given the constraints of a 24 bit Sync pattern which must be discriminated against forward and reverse (1,7) VFO patterns, there is no pattern which is at Hamming distance of 10 or more, so the 5 patterns have optimal error tolerance.

As is well known, the Hamming distance provides certain error detection and correction capabilities. Specifically, if the Hamming distance is d and $2s+t \leq d-1$, then we can tolerate up to s errors and detect up to s+t errors. In the example in which d=9, this means that we can tolerate up to 4 errors. In effect, when sliding the detection template over the detected pattern, as illustrated in FIG. 4, we do not need to find exactly the original synchronization pattern to achieve synchronization. In effect, it is sufficient to find a vector at Hamming distance up to 4 from the original pattern. If a vector is found at Hamming distance of 4 or less, we determine that synchronization has been achieved.

This is illustrated is FIG. 5, where it is assumed that two bit shifts have occurred in the received sequence, causing 4 errors. Thus, the received sequence of the concatenated VFO and synchronization pattern may be:

1010101010101010101010101000010001000100101000 10010.

The Hamming distance "d" is shown for each of the bit positions as the detection template is slid over the received pattern. In this case, when the Hamming distance is 4, we declare synchronization achieved. Thus, the data has been correctly synchronized even in the presence of two bit shifts, which produced four errors.

In accordance with the above formula, we may trade detection for correction. In the above example in which d=9, this means that, for example, we may tolerate 2 errors and detect up to 6 when more than 2 errors have occurred. This may be desirable as opposed to the first example, where we chose to tolerate up to 4 errors, if 5 errors instead occurred. Then, in the first example, we may find the synchronizing pattern at the wrong place. So, we may choose to tolerate up to 2 errors only, and 6 errors will not be tolerated (allow sync detection in the presence of this error) but at least they will be detected and the system, although unable to synchronize, will know that the error tolerance threshold has been exceeded and may attempt to take other corrective action. Most importantly, there will be no attempt to synchronize at the wrong place and the potential catastrophic effect will have been avoided. The exact tradeoff between correction and detection may be determined by one of skill in the art by the statistics of errors and the constraints of the system.

Referring to FIG. 2, an example of a synchronizing detector for the recording read channel 38 is described in the paper, T. Yasuda, M. Blaum and D. D. Tang, "Viterbi Detector Error Probability Analysis and Byte Synchronization Method Using ECC for PR4 Channel", Proceedings 7th MMM-Intermag Conference, San Franciso, Calif., Jan. 7, 1998, comprising a linear shift register with a minimum of components. Other suitable detectors may be utilized and allow the incoming received bits to be exclusive ORed and shifted to provide the appropriate detection characteristics.

Similarly, other synchronization patterns will be employed for other RLL codes, to distinguish over different concatenated known patterns than the "10" or reverse "01" synchronization patterns, and for other pattern lengths.

Although the present invention is particularly advantageous when implemented for the recording of data on magnetic tape, the invention may also be employed for other types of data transmission over a channel, or other types of data storage, such as magnetic disk drives, or optical disks.

While the preferred embodiments of the present invention have been illustrated in detail, it should be apparent that modifications and adaptations to those embodiments may occur to one skilled in the art without departing from the scope of the present invention as set forth in the following claims.

We claim:

1. An error tolerant binary encoded recorded synchronization mark concatenated with a known pattern, and said mark is additionally concatenated with the reverse of said known pattern, comprising:

an encoded pattern of a fixed plurality of bits;

said encoded pattern being at maximum Hamming distance from said concatenated known pattern for the number of bits in said fixed plurality of bits, and wherein said encoded pattern additionally is at maximum Hamming distance from said concatenated reverse known pattern.

2. An error tolerant binary encoded recorded synchronization mark concatenated with a known pattern, wherein said mark comprises a data synchronization mark recorded with data, said data meeting run length limited (d,k) constraints, comprising:

an encoded pattern of a fixed plurality of bits;

said encoded pattern being at maximum Hamming distance from said concatenated known pattern for the number of bits in said fixed plurality of bits and wherein said encoded pattern additionally meets said RLL (d,k) constraints.

3. The error tolerant recorded synchronization mark of claim 2, wherein said encoded pattern additionally meets said RLL (d,k) constraints including the closest bits of said concatenated known pattern.

4. The error tolerant recorded synchronization mark of claim 3, wherein said RLL data is encoded at a rate of (a):(b), and wherein said encoded pattern fixed plurality of bits comprises the number of (b) bits equivalent to 2 bytes of said (a) input bits.

5. The error tolerant recorded synchronization mark of claim 1, wherein said RLL (d,k) code is a (1,7) code, and wherein said encoding rate of (a):(b) is (2):(3), so that said fixed plurality of bits is 24 bits.

6. The error tolerant recorded synchronization mark of claim 5, wherein said concatenated known pattern is a data VFO pattern comprising a sequence of "10" or 2T bits.

7. The error tolerant recorded synchronization mark of claim 6, wherein said mark is additionally concatenated with the reverse of said known data VFO pattern, comprising a sequence of "01" or 2T bits, and wherein said encoded (1,7)-constrained pattern additionally is at maximum Hamming distance from said concatenated reverse known data VFO pattern.

8. The error tolerant recorded synchronization mark of claim 7, wherein said encoded (1,7)-constrained pattern is one of the following patterns:

000010010001001010001010
000010010100100010100010
001001001000010000101010
001001001001010010101010
001001010010000010001010.

9. A data recording medium for recording encoded data, comprising:

a recording medium; and at least one binary encoded recorded data synchronization mark encoded pattern of a fixed plurality of bits, said mark encoded pattern recorded on said data recording medium interspersed with said encoded data, said mark encoded pattern concatenated with a known pattern, and said mark encoded pattern is additionally arranged to be concatenated with the reverse of said known pattern, and said mark encoded pattern being at maximum Hamming distance from said concatenated known pattern for the number of bits in said fixed plurality of bits, and said mark encoded pattern additionally is at maximum Hamming distance from said concatenated reverse known pattern.

10. A data recording medium for recording encoded data, comprising:

a recording medium; and at least one binary encoded recorded data synchronization mark encoded pattern of a fixed plurality of bits, said mark encoded pattern recorded on said data recording medium interspersed with said encoded data, said mark encoded pattern concatenated with a known pattern, and said mark encoded pattern being at maximum Hamming distance from said concatenated known pattern for the number of bits in said fixed plurality of bits, wherein said encoded data meets run length limited (d,k) constraints, and wherein said mark encoded pattern additionally meets said RLL (d,k) constraints.

11. The data recording medium of claim 10, wherein said mark encoded pattern additionally meets said RLL (d,k) constraints including the closest bits of said concatenated known pattern.

12. The data recording medium of claim 11, wherein said RLL data is encoded at a rate of (a):(b), and wherein said mark encoded pattern fixed plurality of bits comprises the number of (b) bits equivalent to 2 bytes of said (a) input bits.

13. The data recording medium of claim 12, wherein said RLL (d,k) code is a (1,7) code, and wherein said encoding rate of (a):(b) is (2):(3), so that said fixed plurality of bits is 24 bits.

14. The data recording medium of claim 13, wherein said concatenated known pattern is a data VFO pattern comprising a sequence of "10" or 2T bits.

15. The data recording medium of claim 14, wherein said mark encoded pattern is additionally arranged to be concatenated with the reverse of said known data VFO pattern, comprising a sequence of "01" or 2T bits, and wherein said mark encoded (1,7)-constrained pattern additionally is at maximum Hamming distance from said concatenated reverse known data VFO pattern.

16. The data recording medium of claim 15, wherein said mark encoded (1,7)-constrained pattern is one of the following patterns:

000010010001001010001010
000010010100100010100010
001001001000010000101010
001001001001010010101010
001001010010000010001010.

17. The data recording medium of claim 16, wherein said data recording medium is a magnetic tape.

18. An encoder for producing a channel bit stream of at least one binary encoded data synchronization mark interspersed with run length limited (RLL) encoded binary bit signals and concatenated with a known pattern, said RLL code having a minimum of (d) and a maximum of (k) "0"s between adjacent "1" bits, comprising:

an RLL encoder for providing said RLL (d,k) encoded binary bit signals in said channel bit stream; and a data synchronization mark generator generating at least one binary encoded recorded data synchronization mark encoded pattern of a fixed plurality of bits, said mark generator providing said encoded pattern interspersed with said encoded data in said channel bit stream, said mark encoded pattern concatenated with said known pattern, and said mark encoded pattern being at maximum Hamming distance from said concatenated known pattern for the number of bits in said fixed plurality of bits.

19. The channel bit stream encoder of claim 18, wherein said concatenated known pattern is a data VFO pattern.

20. The channel bit stream encoder of claim 18, wherein said data synchronization mark is additionally arranged to be concatenated with the reverse of said known pattern, and wherein said mark generator additionally generates said encoded pattern at maximum Hamming distance from said concatenated reverse known pattern.

21. The channel bit stream encoder of claim 18, wherein said mark generator additionally generates said encoded pattern meeting said RLL (d,k) constraints.

22. The channel bit stream encoder of claim 21, wherein said mark generator additionally generates said encoded pattern meeting said RLL (d,k) constraints including the closest bits of said concatenated known pattern.

23. The channel bit stream encoder of claim 22, wherein:

said RLL encoder provides said channel bit stream encoded at a rate of (a) : (b); and said mark generator generates said encoded pattern with said fixed plurality of bits comprising the number of (b) bits equivalent to 2 bytes of said (a) bits.

24. The channel bit stream encoder of claim 23, wherein:

said RLL encoder (d,k) code is a (1,7) code, and wherein said encoding rate of (a):(b) is (2):(3); and said mark generator generated said encoded pattern fixed plurality of (a) bits is 24 bits.

25. The channel bit stream encoder of claim 24, wherein said concatenated known pattern is a data VFO pattern comprising a sequence of "10" or 2T bits.

26. The channel bit stream encoder of claim 25, wherein said data synchronization mark encoded pattern is additionally arranged to be concatenated with the reverse of said known data VFO pattern, comprising a sequence of "01" or 2T bits, and wherein said mark generator additionally generates said encoded (1,7)-constrained pattern at maximum Hamming distance from said concatenated reverse known data VFO pattern.

27. The channel bit stream encoder of claim 26, wherein said mark generator generates one of the following encoded (1,7)-constrained patterns:

000010010001001010001010
000010010100100010100010
001001001000010000101010
001001001001010010101010
001001010010000010001010.

28. A data recording encoder for recording a bit stream of run length limited (d,k) bit signals having a minimum of (d) and a maximum of (k) "0"s between adjacent "1" bits, a known pattern interspersed with said binary bit signals, and a data synchronization mark concatenated with said known pattern, comprising:

an RLL encoder for providing said RLL (d,k) encoded binary bit signals in said channel bit stream; and a data synchronization mark generator generating at least one binary encoded recorded data synchronization mark encoded pattern of a fixed plurality of bits, said mark generator providing said encoded pattern interspersed with said encoded data in said channel bit stream, said mark encoded pattern concatenated with said known pattern, and said mark encoded pattern being at maximum Hamming distance from said concatenated known pattern for the number of bits in said fixed plurality of bits, producing said Resync pattern, including at least one string of "0"s exceeding said RLL (k) constraint, into said channel bit stream; and a data recorder coupled to said RLL encoder and to said data synchronization mark generator for recording said bit stream.

29. The data recording encoder of claim 28, wherein said data synchronization mark is additionally arranged to be concatenated with the reverse of said known pattern, and wherein said mark generator additionally generates said encoded pattern at maximum Hamming distance from said concatenated reverse known pattern.

30. The data recording encoder of claim 28, wherein said mark generator additionally generates said encoded pattern meeting said RLL (d,k) constraints.

31. The data recording encoder of claim 30, wherein said mark generator additionally generates said encoded pattern meeting said RLL (d,k) constraints including the closest bits of said concatenated known pattern.

32. The data recording encoder of claim 31, wherein:

said RLL encoder provides said channel bit stream encoded at a rate of (a):(b); and said mark generator generates said encoded pattern with said fixed plurality of bits comprising the number of (b) bits equivalent to 2 bytes of said (a) bits.

33. The data recording encoder of claim 32, wherein:

said RLL encoder (d,k) code is a (1,7) code, and wherein said encoding rate of (a):(b) is (2):(3); and said mark generator generated said encoded pattern fixed plurality of (a) bits is 24 bits.

34. The data recording encoder of claim 33, wherein said concatenated known pattern is a data VFO pattern comprising a sequence of "10" or 2T bits.

35. The data recording encoder of claim 34, wherein said data synchronization mark encoded pattern is additionally arranged to be concatenated with the reverse of said known data VFO pattern, comprising a sequence of "01" or 2T bits, and wherein said mark generator additionally generates said encoded (1,7)-constrained pattern at maximum Hamming distance from said concatenated reverse known data VFO pattern.

36. The data recording encoder of claim 35, wherein said mark generator generates one of the following encoded (1,7)-constrained patterns:

00001001000100101010001010

00001001010010001010010

00100100100001000010101010

00100100100101001010101010

00100101001000001001010.

37. The data recording encoder of claim 36, wherein said data recorder is a reversible magnetic tape recording device.

38. A method for producing a channel bit stream of at least one binary encoded data synchronization mark interspersed with run length limited (RLL) encoded binary bit signals and concatenated with a known pattern, said RLL code having a minimum of (d) and a maximum of (k) "0"s between adjacent "1" bits, comprising the steps of:

providing RLL (d,k) encoded binary bit signals in said channel bit stream;

generating at least one binary encoded recorded data synchronization mark encoded pattern of a fixed plurality of bits, said mark encoded pattern being at maximum Hamming distance from said known pattern for the number of bits in said fixed plurality of bits; and providing said encoded pattern interspersed with said encoded data in said channel bit stream, said mark encoded pattern concatenated with said known pattern.

39. The method of claim 38, wherein said interspersed providing step additionally concatenates said synchronization mark with a second pattern, said second pattern comprising said known pattern arranged with respect to said synchronization mark so as to be the reverse of said concatenated known pattern, and wherein said mark generating step additionally generates said encoded pattern at maximum Hamming distance from said concatenated reverse known pattern.

40. The method of claim 34, wherein said mark generation step additionally generates said encoded pattern meeting said RLL (d,k) constraints including the closest bits of said concatenated known pattern and including the closest bits of said concatenated reverse known pattern.

41. The method of claim 40, wherein:

said RLL providing step provides said channel bit stream encoded at a rate of (a): (b); and said mark generating step generates said encoded pattern with said fixed plurality of bits comprising the number of (b) bits equivalent to 2 bytes of said (a) bits.

42. The method of claim 41, wherein:

said RLL providing step (d,k) code is a (1,7) code, and said encoding rate of (a):(b) is (2):(3); and said mark generating step generated said encoded pattern fixed plurality of (a) bits is 24 bits.

43. The method of claim 42, wherein said concatenated known pattern is a data VFO pattern comprising a sequence of "10" or 2T bits, wherein said interspersed providing step additionally concatenates said synchronization mark with a second pattern, said second pattern comprising said data VFO pattern arranged with respect to said synchronization mark so as to be the reverse of said concatenated data VFO pattern, comprising a sequence of "01" or 2T bits, and wherein said mark generating step additionally generates said encoded (1,7)-constrained pattern at maximum Hamming distance from said concatenated reverse known data VFO pattern.

44. The method claim 43, wherein said mark generating step generates one of the following encoded (1,7)-constrained patterns:

00001001000100101010001010

00001001010010001010010

00100100100001000010101010

00100100100101001010101010

00100101001000001001010.

* * * * *